Dec. 3, 1935.  G. H. B. WEST  2,022,874
THERMOSTATIC CONTROL DEVICE
Filed June 28, 1934
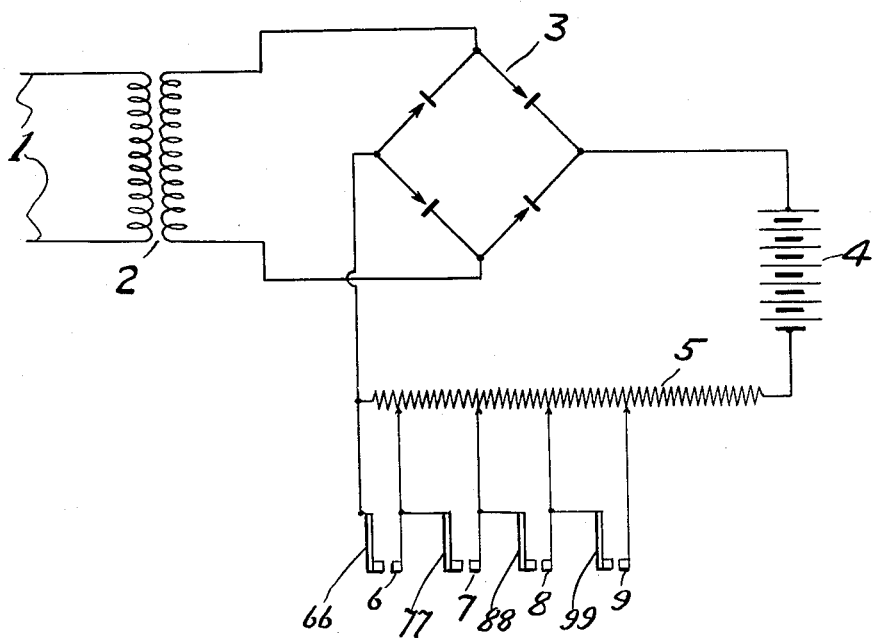
WITNESS:
Rob P Kitchel
INVENTOR
George H. B. West
BY
Augustus B. Stoughton
ATTORNEY.

Patented Dec. 3, 1935

2,022,874

UNITED STATES PATENT OFFICE 2,022,874

THERMOSTATIC CONTROL DEVICE

George H. B. West, Philadelphia, Pa., assignor to The Electric Storage Battery Company, Philadelphia, Pa., a corporation of New Jersey Application June 28, 1934, Serial No. 732,847

4 Claims. (Cl. 171—314)

The object of my invention is to provide a thermostatic control device suitable for use in connection with trickle charging electric storage batteries at fixed rates, and where, due to atmospheric conditions, wide variations in cell temperatures occur during a year, thus making it necessary to adjust charging rates manually.

More specifically, my device consists of a resistor in series with a storage battery and its source of trickle charging current. Sections of the resistor are in parallel with thermostatic switches arranged to operate at different temperatures, so that, at desired temperatures, sections of the resistor are shunted out of circuit, thereby changing the rate of charge.

For a more specific exposition of my invention, reference may be had to the annexed drawing and specification at the end whereof the novel features of my device will be pointed out and claimed.

The single figure of the drawing is an electric diagram.

In that embodiment of my device chosen for illustration in the drawing, there is shown a source of current 1 connected to a transformer 2. Across the secondary of the transformer 2, there is connected a rectifier 3, which may be of any well known type. On the output side of the rectifier there is connected a storage battery 4 to which a trickle charge is to be applied. In series with the rectifier 3, or other source of trickle charge current for the battery, there is connected a resistor 5. Sections of resistor 5 are connected in parallel with a series of thermostatic switches having stationary contacts 6, 7, 8 and 9. Each of the switches has a bi-metallic arm 66, 77, 88 and 99 mounted so as to be movable relative to the stationary contacts 6, 7, 8 and 9.

It is well known that the storage battery develops a greater amount of internal local action and therefore requires a greater trickle charge current to compensate for this, at high temperatures than at low temperatures. The thermostatic switches are so designed and adjusted that at some predetermined maximum temperature, for example 100° F., they will all be closed, thus shunting out all of those sections of the resistor 5 that are controlled by these switches. At some lower temperature, for example 80° F., switch 6—66 will open, introducing additional resistance into the charging circuit and reducing the charging rate. At a further reduction of temperature, say at 60° F., switch 7—77 will open, still further reducing the charging rate. Similarly at 40° F., switch 8—88 will open, and, at 20° F., switch 9—99 will open.

I do not intend to be limited save as the scope of the prior art and of the attached claims may require.

I claim:

1. A thermostatic control device comprising in combination, a source of electricity, a transformer connected to said source, a rectifier connected to the secondary of said transformer, a storage battery connected to said rectifier, a resistor connected in series with said rectifier and said battery, and a plurality of thermostatic switches each connected in parallel with a portion of said resistor, said thermostatic switches being arranged to operate at different temperatures.

2. In a thermostatic control device adapted to supply a trickle charge to an electric storage battery, a variable trickle charge control resistor, and a plurality of thermostatic switches connected in parallel with portions of said resistor and each adapted to short circuit the corresponding portion of said resistor at a different temperature to increase the trickle charge current in steps with successive increments of temperature.

3. A thermostatic control device comprising in combination, a source of trickle charge current, an electric storage battery connected to said source, a variable trickle charge control resistor connected in series with said battery and said source, and a plurality of thermostatic switches each connected in parallel with a portion of said resistor and each arranged to open or close contact at a different temperature.

4. In a thermostatic control device adapted to supply a trickle charge current to an electric storage battery, a variable trickle charge control resistor adapted to vary the trickle charge current inversely with the value of the resistance in circuit, and a plurality of thermostatic switches connected in parallel with portions of said resistor, all of which switches are adapted to be in the closed position at a predetermined maximum temperature and adapted to be opened successively at different lower temperatures.

GEORGE H. B. WEST.